United States Patent [19]
Despres et al.

[11] Patent Number: 5,803,442
[45] Date of Patent: Sep. 8, 1998

[54] TORSION DAMPING DEVICE HAVING TILTABLE SPRING SEATS OF COMPOSITE STRUCTURE, ESPECIALLY FOR MOTOR VEHICLES

[75] Inventors: Dominique Despres; Olivier Bouchez, both of Amiens, France

[73] Assignee: Valeo, Cedex, France

[21] Appl. No.: 623,791

[22] Filed: Mar. 29, 1996

[30] Foreign Application Priority Data

Mar. 31, 1995 [FR] France ................................ 95 00843

[51] Int. Cl.[6] ...................................... F16F 15/12
[52] U.S. Cl. ........................ 267/168; 464/68; 192/106.2
[58] Field of Search ................................. 267/290, 179, 267/168; 188/378, 379, 380; 464/68, 64; 192/106.2

[56] References Cited

U.S. PATENT DOCUMENTS

| | | | |
|---|---|---|---|
| 2,375,050 | 5/1945 | Tauscher | 267/168 |
| 4,899,617 | 2/1990 | Kobayashi et al. | |
| 4,904,226 | 2/1990 | Chasseguety et al. | 464/68 |
| 4,950,205 | 8/1990 | Umeyama | 464/68 |

FOREIGN PATENT DOCUMENTS

| | | |
|---|---|---|
| 0258112 | 3/1988 | European Pat. Off. . |
| 0308178 | 3/1989 | European Pat. Off. . |
| 1328276 | 9/1963 | France . |
| 2599800 | 12/1987 | France . |
| 2627243 | 8/1989 | France . |
| 3832955 | 4/1989 | Germany . |
| 62-42174 | 10/1987 | Japan ........................ 464/68 |
| 2179119 | 2/1987 | United Kingdom ............ 464/68 |

*Primary Examiner*—Matthew C. Graham
*Attorney, Agent, or Firm*—Longacre & White

[57] ABSTRACT

A torsion damping device, in particular for inclusion in a clutch friction wheel of a motor vehicle clutch, includes springs which are in end thrust engagement on thrust inserts or spring seats which are mounted for pivoting movement in the friction wheel. The anterior part of each of these spring seats, on which the springs are in end thrust and/or centring engagement, is made at least partly of synthetic material, while the posterior part of the spring seat, by which the latter is pivotally mounted in the friction wheel, is made at least partly of metal.

19 Claims, 2 Drawing Sheets

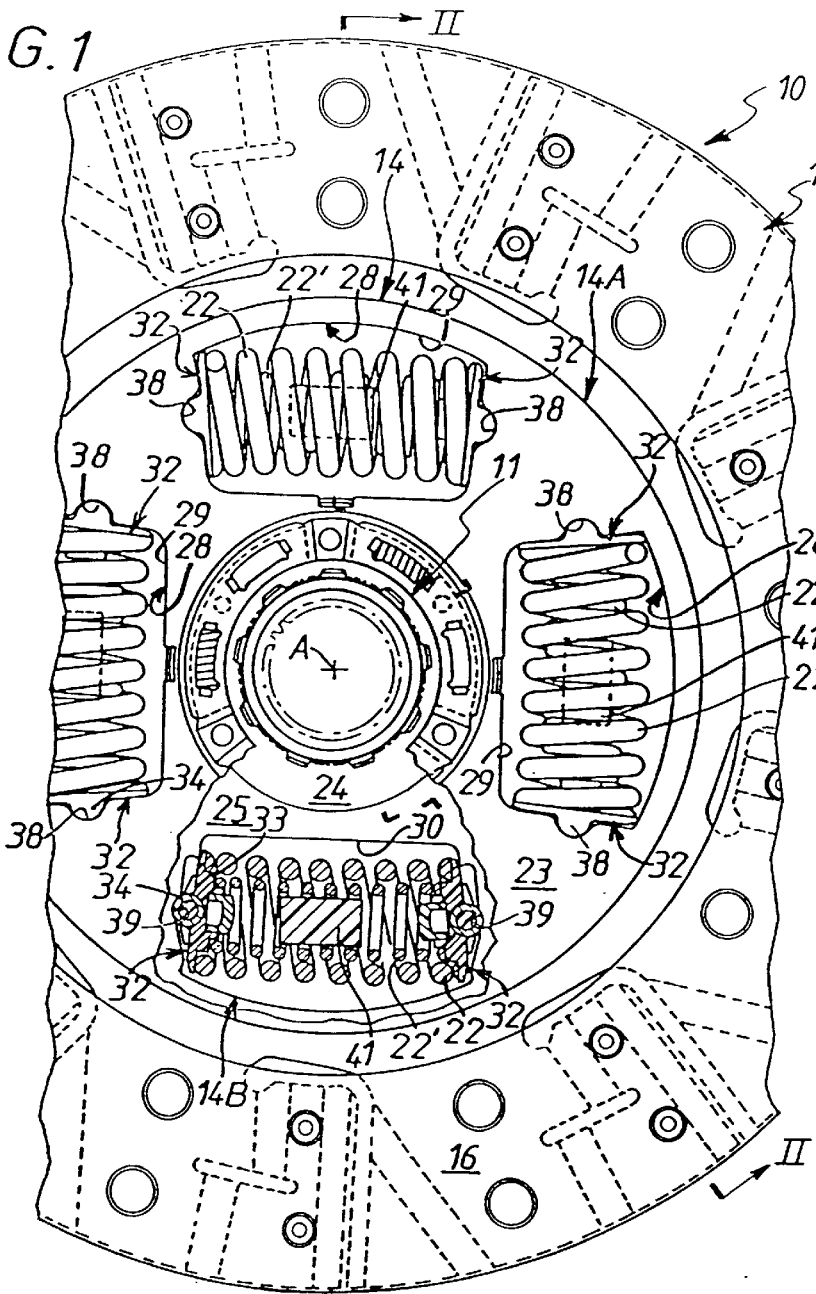
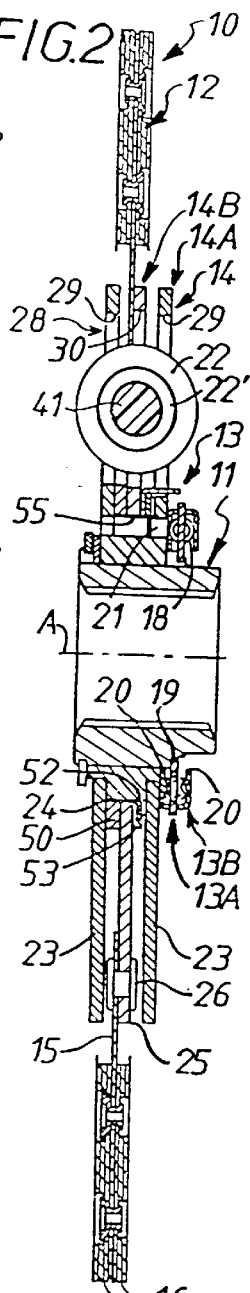
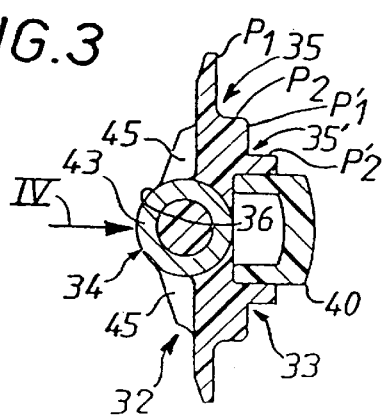
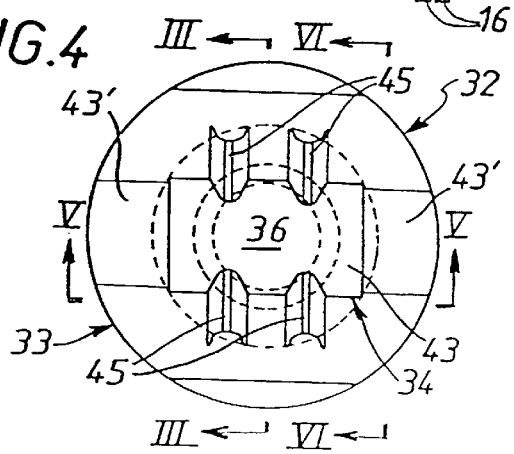

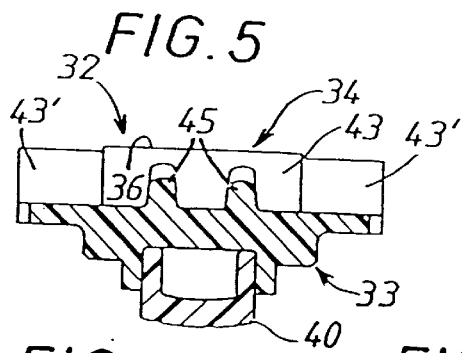
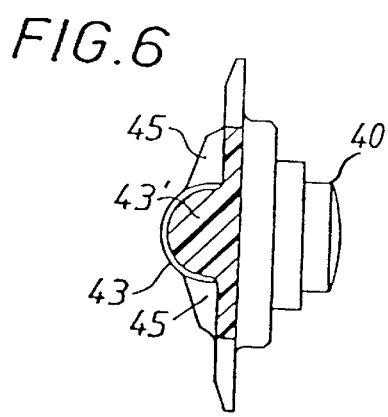
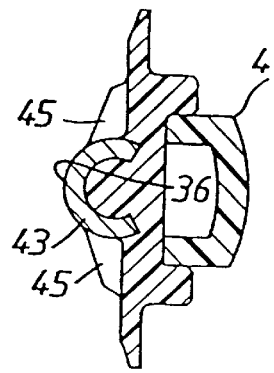
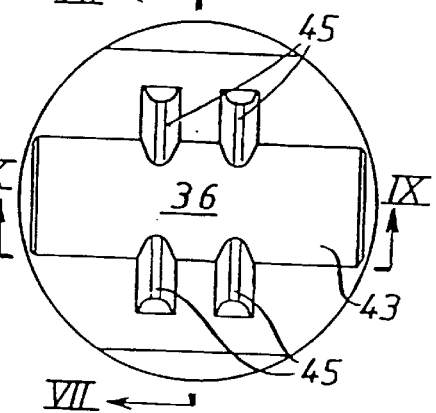
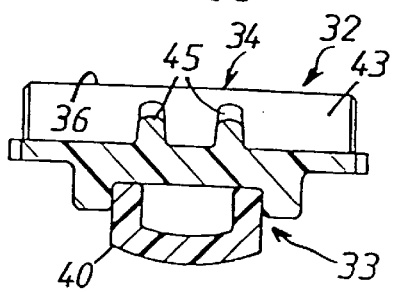
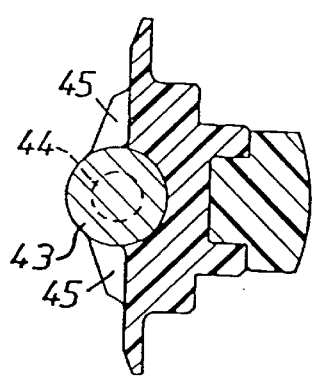
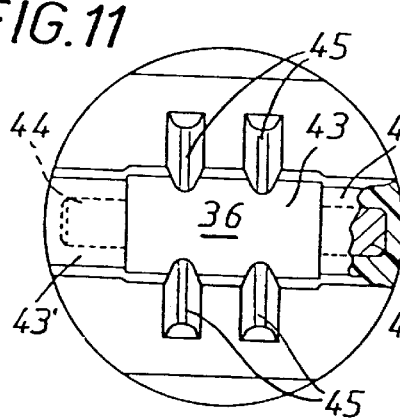
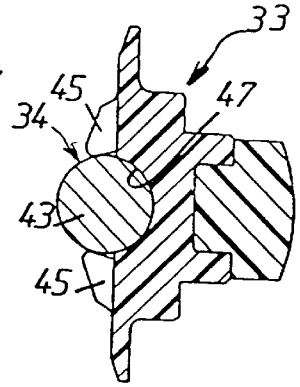
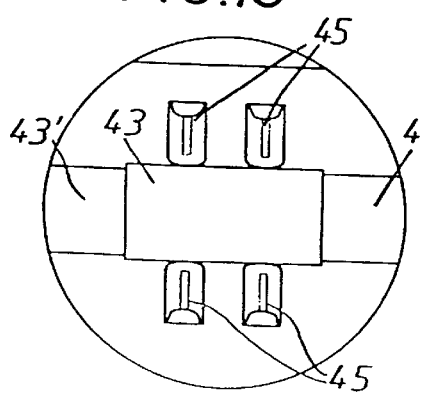
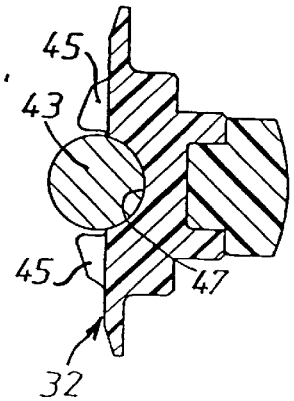
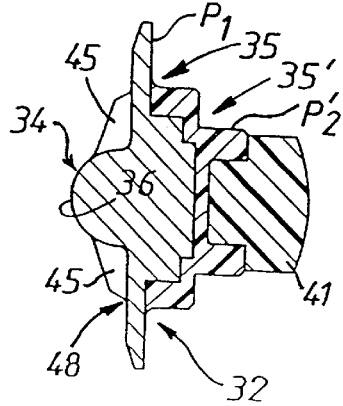

TORSION DAMPING DEVICE HAVING TILTABLE SPRING SEATS OF COMPOSITE STRUCTURE, ESPECIALLY FOR MOTOR VEHICLES

FIELD OF THE INVENTION

This invention relates to torsion damping devices, of the kind comprising two coaxial parts which are mounted for rotation of one with respect to the other against the action of springs which are interposed circumferentially between the said coaxial parts.

Such a torsion damping device is applicable, in particular, in the construction of a clutch friction wheel, in particular for a motor vehicle, or in the construction of the inertia flywheel of a motor vehicle, otherwise commonly referred to as a double damped flywheel.

More particularly, the invention is directed to the case where a spring seat (which may also be called a thrust insert or thrust pad, for example) is inserted between, on the one hand, at least one of the ends of at least one of the springs, and on the other hand, one or other or both of the coaxial parts, the spring seat being interposed circumferentially between the latter and the associated spring or springs and having an anterior part and a posterior part, the anterior part being in end thrust engagement and/or centring engagement with at least one of the springs, with its posterior part itself bearing on at least one of the said coaxial parts of the torsion damping device, being mounted for pivoting movement with respect to the said coaxial parts about an axis parallel to the common axis of these latter.

BACKGROUND OF THE INVENTION

An arrangement of the kind just described is disclosed, for example, in European patent specification No. EP 0 258 112A. The thrust inserts on which the springs bear, due to their pivoting mounting, enable the springs to work under favourable conditions in service, even at full torque, while retaining some degree of parallelism between their ends.

In addition, the pivoting thrust inserts or spring seats also advantageously oppose the effects of centrifugal force on the springs. Finally, they may also have the advantage that they serve to support nose elements of resilient material, which, working as full-torque abutments, give the advantage of even distribution of the forces occurring within the springs before mutual engagement of the turns of adjacent springs occurs, in respect of at least some of the latter.

At the present time these thrust inserts typically have a uniform structure. For example, and as is disclosed in European patent specification No. EP 0 258 112A, they are made entirely of synthetic material. Due to their pivoting mounting, the posterior part of the thrust insert, at least, is then inevitably subject to some degree of wear, and the nature of this wear is detrimental to effective action of the thrust inserts.

In another version, these thrust inserts or spring seats may be made entirely of metal. However, whether they are made by forging or sintering (for example), the cost of the thrust inserts is then relatively high, due notably to the fact that, with their pivoting mounting, these are relatively complex components.

DISCUSSION OF THE INVENTION

An object of the invention is to provide a torsion damping device in which the thrust inserts or spring seats are of relatively inexpensive construction, without their effectiveness being impaired.

According to the invention, a torsion damping device, of the kind comprising two coaxial parts mounted for rotation of one with respect to the other, against the action of springs interposed circumferentially between the said coaxial parts, with, interposed circumferentially between, on the one hand at least one of the ends of at least one of the said springs and, on the other hand, one or other or both of the said coaxial parts, a spring seat, an anterior part of which provides end thrust engagement and/or centring for at least one associated said spring, and which, through a posterior part thereof, itself bears on one or other or both of the said coaxial parts, being mounted pivotally with respect to these latter about an axis parallel to the axis of the said coaxial parts, with the said posterior part having for this purpose, at least locally, a cylindrical surface of curved transverse cross section, is characterised in that the anterior part of the spring seat is at least partly made of synthetic material, while its posterior part is made at least partly of metal.

Thanks to this composite structure of the spring seat of the kind provided by the invention, which has the advantage that it can be made relatively inexpensively, the spring seats thereby employed are able to perform all their functions to the best advantage without any danger of undue wear taking place.

The various features and advantages of the invention will appear more clearly from a reading of the following description of preferred embodiments of the invention, which is given by way of example only and with reference to the attached diagrammatic drawings.

BRIEF DESCRIPTION OF THE DRAWINGS

FIG. 1 is a partial view in elevation, shown locally cut away, of a torsion damping device in accordance with the invention.

FIG. 2 is a view of the same damping device, shown in axial cross section take on the line II—II in FIG. 1.

FIG. 3 a scrap view taken from FIG. 1, but on a larger scale, of one of the thrust inserts or seats employed in the torsion damping device seen in FIGS. 1 and 2, being a view in transverse cross section taken on the line Ill—Ill in FIG. 4.

FIG. 4 is a view of the same spring seat in elevation, seen in the direction of arrow IV in FIG. 3.

FIG. 5 is a view of the same spring seat in longitudinal cross section taken on the line V—V in FIG. 4.

FIG. 6 is another view in transverse cross section of the same spring seat, taken on the line VI—VI in FIG. 4.

FIGS. 7, 8 and 9 are views similar to FIGS. 3, 4 and 5 respectively, but show a second embodiment.

FIGS. 10 and 11 are views similar to FIGS. 3 and 4 respectively, but show a third embodiment, with FIG. 11 showing the spring seat partly in cross section.

FIGS. 12 and 13 are views similar to FIGS. 3 and 4, but show a fourth embodiment.

FIG. 14 is a view similar to FIG. 3 but showing a fifth embodiment.

FIG. 15 is a view, again similar to FIG. 3, but showing a sixth embodiment.

DESCRIPTION OF PREFERRED EMBODIMENTS OF THE INVENTION

The drawings show by way of example the application of the invention to a clutch friction wheel 10, in particular for a motor vehicle clutch. The clutch friction wheel 10 comprises a hub 11 and a friction disc 12, with two torsion damping devices 13 and 14 which, in this example, are interposed in series between the hub 11 and the friction disc 12.

The friction disc 12 is adapted to be mounted on a driving shaft, for rotation with the latter. In practice this driving shaft is the engine shaft or crankshaft of the engine of the motor vehicle. The hub 11 is itself arranged to be mounted on a driven shaft for rotation with the latter. This driven shaft is in practice the input shaft of the gearbox.

The friction disc 12 comprises a thin annular plate 15 which may be divided into a plurality of blades, together with two friction liners 16, each of which is carried at the periphery of the annular plate 15, being arranged on either side of the latter so as to be gripped between the pressure plate and reaction plate (not shown) of the clutch.

The first torsion damping device 13 is a predamper in the present example, being arranged to work at low torques. It comprises two coaxial parts 13A and 13B, which are mounted for rotation of one with respect to the other against the action of springs 18, which are interposed circumferentially between the two coaxial parts 13A and 13B. One of the latter, in this example the coaxial part 13A, which consists of a simple, flat, annular ring 19, is mounted on the hub 11, in this example by seaming, so as to be rotatable with the hub 11. The other coaxial part, i.e. here the part 13B, consists in the present case of two guide rings 20 which flank the flat ring 19. The part 13B meshes with the torsion damping device 14 by means of spigots 21.

The torsion damping device 14 is the main torsion damper, and is arranged to work at high transmitted torques. The main torsion damper 14 also comprises two coaxial parts, 14A and 14B, which are mounted for rotation of one with respect to the other within the limits of a predetermined angular displacement and against the action of springs 22 and 22', which are interposed circumferentially between the two coaxial parts 14A and 14B.

In the present case the coaxial part 14A comprises two guide rings 23 which are mounted parallel to each other and spaced apart from each other. These guide rings 23 are fixed, at their inner periphery, to a support ring 24, through which they are in mesh, with a clearance, with the hub 11. The support ring 24 has for this purpose a set of internal teeth which mesh (with the same clearance) with an external set of teeth of the hub 11.

In this example the coaxial part 14B of the main damper includes a damper plate 25 which is interposed between the guide rings 23, being spaced from each of the latter. The damper plate 24 is mounted for free rotation around the support ring 24. The friction disc 12 is fixed to the damper plate 25, in the present case by means of rivets 26.

The springs 22 and 22', which are stiffer than the springs 18, are of the coil spring type. They are arranged coaxially in groups of two, with the springs 22', i.e. those of lesser diameter and lower stiffness, being arranged with each spring 22' inside a corresponding one of the springs 22. In the example shown, there are four of these groups of springs 22, 22', these groups being spaced apart at regular intervals on a circle. They are all aligned substantially tangentially to a common circumference of the assembly. Each group of springs 22, 22' is mounted in a housing 28 which is defined partly by a window 29 in the guide rings 23 of the coaxial part 14A, and partly by a window 30 in the damper plate 25 of the coaxial part 14B.

Between, on the one hand, at least one of the ends of at least one of the springs 22, 22', and, on the other hand, one or other (or both) of the coaxial parts 14A and 14B, a thrust insert or spring seat 32 is interposed circumferentially. Each spring seat 32 comprises a first part 33 and a second part 34, which will be referred to here as the anterior part and the posterior part respectively. At least one of the springs 22, 22' is in end thrust engagement on, and/or is centred by, the anterior part 32. The posterior part 34 itself engages on one or other, or both, of the coaxial parts 14A, 14B of the main damper, and is mounted for pivoting movement with respect to the two parts of the damper about an axis parallel to the common axis of the two coaxial parts, and therefore parallel to the axis A of the hub 11.

In the present example, one spring seat 32 is provided at each end of each group of springs 22, 22', being common to both of the springs of that group. All of the spring seats 32 are identical to each other.

The anterior part 33 of each spring seat has a cross section which is formed in steps, for end thrust engagement by the two associated springs 22 and 22', and for centring those springs. Accordingly, here, the anterior part 33 is formed with two annular, concentric steps 35 and 35', of which the outer step 35 provides end thrust engagement and centring for the spring 22, while the inner step 35' provides end thrust engagement and centring for the inner spring 22'. Each of the steps 35, 35' comprises a transverse portion $P_1$, $P'_1$, for engagement with the corresponding spring 22 or 22'. These transverse portions lie at right angles to the axis of the springs 22, 22' respectively in the rest, or relaxed, condition. Each step 35, 35' also has an axial portion $P_2$, $P'_2$, parallel to the same axis, for the purpose of centring the corresponding spring 22 or 22'.

In conjunction with this, the posterior part 34 of each spring seat 34, which projects from the back of the anterior part 33, extends axially, that is to say parallel to the axis A of the hub 11. For engagement on one or other, or both, of the coaxial parts 14A, 14B of the main damper, the posterior part 34 has, at least locally, a cylindrical surface 36 with a generally curved transverse cross section. The spring seats 32 are in tilting engagement, through their posterior parts 34, with corresponding notches 38 having a generally curved profile, which are formed for this purpose in a substantially complementary manner on the radial edges of the windows 19 of the guide rings 23 of the coaxial part 14A of the main damper; alternatively or in addition, the posterior parts 34 engage in further notches 39, again with a generally curved profile, which are arranged correspondingly, and again in a substantially complementary manner, on the radial edges of the windows 30 of the damper plate 25 of the coaxial part 14B.

In this example, the spring seats 32 carry a nose element 40 of a suitable resilient material, which projects from the anterior part 33 in the central zone of the latter. The nose element 40 cooperates with a stop block 41 of a synthetic material. This stop block 41 is mounted floatingly within the corresponding inner spring 22', in a middle zone of the latter. The material of each stop block 41 is for example a polyamide of type 6.6.

A reverse structure may of course be adopted, with the nose elements being of synthetic material and the stop blocks 41 of elastic material.

The anterior part 33 of each spring seat 32 is made at least partly of a synthetic material, while its posterior part 34 is made at least partly of metal. In FIGS. 1 to 14, the anterior part 33 is in fact made entirely of synthetic material, which may for example be polyamide of type 6.6.

In conjunction with the foregoing, the posterior part 34 of each thrust insert or spring seat 32 comprises a metal barrel element 43 which defines, at least locally, on its external surface the cylindrical surface 36 which is necessary for its engagement on one or other, or both, of the coaxial parts 14A, 14B of the main damper. In this example, the barrel element 43 constitutes by itself the posterior part 34 of the spring seat 32. It is made for example of steel having a high percentage of carbon, or of aluminum. In this example its cylindrical surface 36 has a circular transverse cross section.

In FIGS. 1 to 6, the barrel element 43 is tubular, and its transverse cross section is an endless circle, while the anterior part 33 of the thrust element has a circular contour in elevation. The barrel element 43 extends in the axial direction substantially along a diameter of this contour, but terminates at a distance from the perimeter of the anterior part 33, as is best seen in FIG. 4. The ends of the barrel element 43 thus lie spaced away from the outer circumference of the anterior part, and are substantially in line with the step 35' of the latter which corresponds to the inner spring 22'.

In addition, in order to give the whole some degree of extra stiffening, two beads 43', which are made integral with the anterior part 33, extend the barrel element 43 at either end of the latter. The beads 43' have a similar transverse cross section, but are of slightly reduced diameter. They extend as far as two diametrically opposed zones of the perimeter of the anterior part 33.

Reference is now made to FIGS. 7 to 9, showing a modified version in which the transverse cross section of the barrel element 43 is open C-shaped, the element 43 being on the side of the anterior portion 33 of the spring seat 32 and subtending an angle of opening smaller than 180 degrees. In this case, the barrel element 43 extends from one of the two diametrically opposed zones of the perimeter of the anterior part 33 to the other. It thus overlies, not only the step 35' of the latter which corresponds to the associated inner spring 22', but also the outer step 35 which corresponds to the outer spring 22.

In the further version which is shown in FIGS. 10 and 11, the barrel element 43 is solid, and although, as in FIGS. 1 to 6, it terminates at a distance from the perimeter of the anterior part 33, it has at each of its ends an extension 44 of reduced diameter, which is in line with the step 35 of the anterior part 33 corresponding to the spring 22. Each of these extensions 44 lies within the corresponding bead 43'.

In all of FIGS. 1 to 11, the barrel element 43 constitutes, or is part of a separate piece, on which the anterior part 33 is formed by superimposed moulding of its synthetic material on to this piece. Where the barrel element 43 is tubular, the synthetic material of the anterior part 33 may, according to the moulding procedure used, penetrate into the interior of the barrel element as shown in FIGS. 1 to 9, but this is not essential. Where the barrel element 43 is solid, the synthetic material covers its extensions 44 with the beads 43', as is shown in FIGS. 10 and 11.

In the present case at least one retaining rib 45 projects integrally from the back of the anterior part 33. These ribs 45 extend transversely with respect to the axis of the posterior part 34, and therefore with respect to the axis A of the hub 11. In the examples shown, there are four of these retaining ribs 45. They are arranged in pairs, in facing relationship to each other, on either side of the barrel element 43, and they extend over at least part of the barrel element 43, while at least locally following the profile of the latter.

The retaining ribs 45 here extend only over a portion of the barrel element 43, leaving its rear portion entirely free so, that the latter can cooperate suitably with the notches 38 in the guide rings 23 and the notches 39 in the damper plate 25. The ribs 45 are located (axially of the damper) between the damper plate 25 and the guide rings 23, and the axial spacing between them is a function of the thickness of the damper plate 25.

The purpose of the retaining ribs 45 is to locate the spring seats 32 axially on the damper plate 25, so as to prevent them from escaping from the housings 28 for the springs 22 and 22'. In this connection, the guide rings 23 do not have any retaining lip in this case along the circumferential edges of their windows 29. Where such retaining lips for the springs 22 and 22' do exist, the retaining ribs 45 are not essential.

Referring now to FIGS. 12 and 13, showing yet another version of the spring seat 32, the barrel portion 43 of the latter is solid in this case, and is snap-fitted on to the anterior part 33 of the spring seat, at the back of the latter. In this example the retaining ribs 45 at least play a part in the snap-fitting of the barrel element 43, and in the particular embodiment shown they alone do in fact provide this snap-fitting. For this purpose they are arranged slightly obliquely, being convergent towards each other on either side of the barrel element 43.

In this example, the barrel element 43 is at least partially engaged through its front portion in a cradle groove 47, which is provided for receiving it at the back of the anterior part 33.

The same is true in FIG. 14, in which, however, the barrel element 43 is simply bonded adhesively to the anterior part 33 instead of being snap-fitted to it. In this case, the ribs 45 lie spaced away from the barrel element 43, without making contact with the latter.

In the final embodiment to be specifically described here, i.e. that shown in FIG. 15, at least the transverse portion $P_1$ of the outer step 35 of the anterior part 33 is of metal, and is formed on a member 48 on which at least the axial portion $P'_2$ of the inner step 35' is bonded. The posterior part 34 of the spring seat 32 is an integral part of this member 48. Thus, the associated spring 22, i.e. the one having the higher stiffness, bears on a metallic component, namely the member 48.

In this example, only the transverse portion $P_1$ of the outer step 35 is of metal, the remainder of the anterior part 33 being of synthetic material as before. Corresponding application of the anterior part can for example be carried out by moulding it on to the member 48. However, it may also be obtained by adhesive bonding, by snap-fitting, by screw fastening, or otherwise.

In this case the posterior part 34 is at the same time reduced to a bead having a semicircular transverse cross section, which is integral with the member 48. Retaining ribs 45 are provided as before.

In all cases, the spring seats 32 are able to tilt so as to permit the ends of the associated springs 22 and 22' to remain substantially parallel to each other in use. In the relaxed condition, they are in engagement on the radially innermost part of the radial edges of the windows 29 of the guide rings 23. At the end of the angular displacement between the guide rings 23 and the damper plate 25, they are in engagement against the radially outermost part of these radial edges.

In the embodiments shown in the drawings, friction means are also provided between the coaxial parts 14A and 14B of the main damper 14, so as to enable some degree of hysteresis to be obtained. These friction means here include a friction ring 50, which is interposed axially between one of the guide rings 23 of the coaxial part 14A and the damper plate 25 of the coaxial part 14B, together with an axially acting resilient ring 52 which is arranged between the damper plate 25 and the other guide ring 23. The resilient ring 52 ensures that the friction ring 50 is gripped axially.

In the friction means shown here, a ring 53, which may also be a friction ring, is interposed between the resilient ring 52 and the damper plate 25. This ring 53 is located by means of lugs on the guide ring 23 on which the resilient ring 52 is in engagement, so as to be rotatable with that guide ring.

The torsion damping device 13, or predamper, is here arranged laterally, outside the torsion damping device 14, against one guide ring 23 of the coaxial part 14A of the latter. The spigots 21, with which the coaxial part 13B of the predamper is fixed, are in engagement with through holes 55 which are provided for this purpose in that guide ring 23.

The present invention is of course not limited to the embodiments described above and shown in the drawings, but embraces all modified versions and/or combinations of their various elements.

In particular, it is possible to reverse the structures, with the damper plate 25 meshing, with a clearance, by virtue of a set of internal teeth, with a set of external teeth of the hub 11. The guide rings 23 will then be mounted for free rotation with respect to the hub 11, the guide rings 23 being connected together and fixed to the friction disc 12. The friction disc 12 is here fixed, for example by riveting, to one of the guide rings. In this case, the torsion damping device 13, or predamper, is mounted axially between one of the guide rings 23 and the damper plate 25. It can in fact be omitted in some cases.

What is claimed is:

1. A torsion damping device comprising: a first damper part; a second damper part coaxial with the first damper part, at least two springs interposed circumferentially between said first and second damper parts; means mounting said first and second damper parts coaxially with each other for rotation of one with respect to the other against the action of said springs; and at least one spring seat interposed circumferentially between at least one end of at least one of said springs and at least one of said damper parts, said spring seat having an anterior part and a posterior part joined to the anterior part, for engagement of the anterior part with at least one of said springs for at least one function selected from end thrust engagement with, and centering of, that spring, and for engagement of the posterior part on at least one of said coaxial damper parts of the torsion damping device, said damper parts defining a common axis, and the posterior part of the spring seat defining a pivot axis for the spring seat parallel to said common axis, said posterior part having a cylindrical surface defining a curved transverse cross section thereof and also defining said pivot axis, said cylindrical surface being in pivoting engagement with an associated one of said damper parts, wherein the anterior part of the spring seat is made at least partly of synthetic material, its posterior part being made at least partly of metal.

2. A torsion damping device comprising: a first damper part; a second damper part coaxial with the first damper part, at least two springs interposed circumferentially between the said first and second damper parts; means mounting the said first and second damper parts coaxially with each other for rotation of one with respect to the other against the action of the said springs; and at least one spring seat interposed circumferentially between at least one end of at least one of said springs and at least one of said damper parts, said spring seat having an anterior part and a posterior part joined to the anterior part, for engagement of the anterior part with at least one of said springs for at least one function selected from end thrust engagement with, and centering of, that spring, and for engagement of the posterior part on at least one of said coaxial damper parts of the torsion damping device, said damper parts defining a common axis, and the posterior part of the spring seat defining a pivot axis for the spring seat parallel to said common axis, said posterior part having a cylindrical surface defining a curved transverse cross section thereof and also defining said pivot axis, said cylindrical surface being in pivoting engagement with an associated one of said damper parts, wherein the anterior part of the spring seat is made at least partly of synthetic material, its posterior part being made at least partly of metal the posterior part of said spring seat comprises a metal barrel element defining externally thereof said cylindrical surface for engagement on at least one of the said damper parts.

3. A torsion damping device according to claim 1, wherein said barrel element is tubular and defines an endless circular transverse cross section thereof.

4. A torsion damping device according to claim 1, wherein said barrel element is tubular and defines a transverse cross section thereof which is open towards the anterior part of the spring seat.

5. A torsion damping device according to claim 1, wherein the anterior part of the spring seat has a circular contour in elevation, said barrel element of the posterior part extending axially along a diameter of the said contour.

6. A torsion damping device according to claim 5, wherein said contour constitutes a perimeter of the anterior part of the spring seat, said perimeter defining two diametrically opposed zones thereof, with said barrel element extending from one said zone to the other.

7. A torsion damping device according to claim 5, wherein said contour of the anterior part of the spring seat constitutes a perimeter thereof, said barrel element terminating short of said perimeter.

8. A torsion damping device according to claim 7, wherein said barrel element is solid.

9. A torsion damping device according to claim 8, wherein said barrel element has an extension of reduced cross section at each of its ends.

10. A torsion damping device according to claim 1, wherein said barrel element constitutes at least part of a separate piece, with said anterior part of the spring seat being moulded on to said piece.

11. A torsion damping device according to claim 1, wherein said barrel element of said spring seat is snap-fitted on to the anterior part of the spring seat.

12. A torsion damping device according to claim 1, wherein said barrel element is adhesively bonded to the anterior part thereof.

13. A torsion damping device according to claim 1, wherein the anterior part of said spring seat has a back defining a cradle groove therein, said barrel element being at least partially engaged in the said cradle groove.

14. A torsion damping device according to claim 1, wherein said spring seat further includes at least one retaining rib which extends transversely with respect to the axis of the posterior part of the spring seat, and which is formed integrally with the back of the anterior part.

15. A torsion damping device according to claim 14, wherein said retaining rib is disposed on said barrel element and follows, at least locally, the profile of the latter.

16. A torsion damping device according to claim 15, wherein said retaining rib extends only over a portion of said barrel element, the latter having a rear portion which is totally uninterrupted.

17. A torsion damping device according to claim 14, wherein said spring seat includes means snap-fitting said barrel element to the remainder of the spring seat, said snap-fitting means including at least one said retaining rib.

18. A torsion damping device according to claim 14, wherein said retaining rib lies spaced away from said barrel element.

19. A torsion damping device according to claim 14, having four said retaining ribs arranged in pairs, facing towards each other and on either side of said posterior part of the spring seat.

* * * * *